(12) United States Patent
Stevenson et al.

(10) Patent No.: US 12,650,226 B1
(45) Date of Patent: Jun. 9, 2026

(54) SYSTEM AND METHOD FOR FUEL AND INERT GAS INJECTION IN TURBINE SECTION OF GAS TURBINE ENGINE

(71) Applicant: GE Infrastructure Technology LLC, Greenville, SC (US)

(72) Inventors: Christian Xavier Stevenson, Mountville, SC (US); Joel Meador Hall, Simpsonville, SC (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 2 days.

(21) Appl. No.: 19/044,520

(22) Filed: Feb. 3, 2025

(51) Int. Cl.
| | |
|---|---|
| *F23R 3/18* | (2006.01) |
| *F02C 3/16* | (2006.01) |
| *F02C 3/30* | (2006.01) |
| *F23R 3/12* | (2006.01) |
| *F23R 3/16* | (2006.01) |
| *F23R 3/28* | (2006.01) |

(52) U.S. Cl.
CPC .................. *F23R 3/18* (2013.01); *F02C 3/16* (2013.01); *F02C 3/30* (2013.01); *F23R 3/12* (2013.01); *F23R 3/16* (2013.01); *F23R 3/28* (2013.01)

(58) Field of Classification Search
CPC .... F23R 3/286; F23R 3/12; F23R 3/34; F23R 3/28; F23R 3/346; F23R 3/16; F23R 3/18; F23R 3/20; F23R 3/22; F23R 3/26; F23L 2900/07002; F02C 3/04; F02C 3/14; F02C 3/30; F02C 7/222; F02C 3/20; F02C 7/22; F02C 9/28; F02C 7/224; F02C 7/228; F02C 9/40; F02C 3/16; F05D 2220/32; F05D 2240/35
See application file for complete search history.

(56) References Cited

U.S. PATENT DOCUMENTS

| | | | |
|---|---|---|---|
| 3,752,172 | A | 8/1973 | Cohen et al. |
| 5,496,170 | A * | 3/1996 | Primdahl ................ F23D 14/24 |
| | | | 431/9 |
| 7,415,827 | B2 | 8/2008 | Bertolotti et al. |
| 7,658,076 | B2 | 2/2010 | Hoffmann |
| 8,104,286 | B2 | 1/2012 | Zuo et al. |

(Continued)

FOREIGN PATENT DOCUMENTS

| | | | | |
|---|---|---|---|---|
| CH | 710507 | A2 * | 6/2016 | .............. F23R 3/346 |
| EP | 3623604 | A1 * | 3/2020 | ................ F02C 9/40 |

OTHER PUBLICATIONS

T.F. Fric et al. "Vortical structure in the wake of a transverse jet", Jun. 10, 1994.

*Primary Examiner* — Craig Kim

(74) *Attorney, Agent, or Firm* — Fletcher Yoder, P.C.

(57) ABSTRACT

A system includes at least one component of a turbine section. The at least one component includes a fuel port formed into a wall of the at least one component, which is configured to inject fuel into a chamber of the turbine section. The at least one component also includes an inert gas port formed into the wall upstream of the fuel port. The inert gas port is configured to inject an inert gas to flow at least partially around the injected fuel into a buffer region downstream from the fuel port. The presence of the inert gas in the buffer region may mitigate an ignition of the fuel near the surface of the wall downstream of the fuel port (e.g., flame anchoring) and/or help to lift the flame from the ignited fuel into the hot gas flow path.

20 Claims, 9 Drawing Sheets

(56)  References Cited

U.S. PATENT DOCUMENTS

| | | | | |
|---|---|---|---|---|
| RE43,252 | E | 3/2012 | Ginter et al. | |
| 8,408,896 | B2 | 4/2013 | Ponzi et al. | |
| 8,438,851 | B1 * | 5/2013 | Uhm | F23R 3/286 |
| | | | | 60/737 |
| 8,607,572 | B2 | 12/2013 | Koizumi et al. | |
| 8,893,510 | B2 * | 11/2014 | Tham | F01D 5/088 |
| | | | | 60/785 |
| 9,170,023 | B2 | 10/2015 | Guethe et al. | |
| 9,574,769 | B2 | 2/2017 | Ponzi et al. | |
| 9,989,260 | B2 * | 6/2018 | Hughes | F02C 3/04 |
| 10,107,498 | B2 | 10/2018 | Widener et al. | |
| 10,760,793 | B2 | 9/2020 | Patel et al. | |
| 11,353,212 | B2 | 6/2022 | Zink et al. | |
| 11,680,523 | B2 * | 6/2023 | Jaerling | F02C 6/08 |
| | | | | 60/785 |
| 11,891,949 | B1 * | 2/2024 | Woodall | F02C 6/18 |
| 2007/0003897 | A1 | 1/2007 | Koizumi et al. | |
| 2007/0029408 | A1 | 2/2007 | Hewitt | |
| 2008/0134685 | A1 | 6/2008 | Bunker et al. | |
| 2009/0311638 | A1 | 12/2009 | De Smedt et al. | |
| 2010/0192577 | A1 | 8/2010 | Singh et al. | |
| 2010/0282185 | A1 | 11/2010 | Sanchez-Molinero et al. | |
| 2013/0019584 | A1 | 1/2013 | Koizumi et al. | |
| 2013/0086917 | A1 | 4/2013 | Slobodyanskiy et al. | |
| 2013/0133331 | A1 | 5/2013 | Singh et al. | |
| 2013/0327011 | A1 * | 12/2013 | Overby | F23R 3/28 |
| | | | | 29/889.22 |
| 2014/0123675 | A1 * | 5/2014 | Tham | F01D 5/088 |
| | | | | 60/782 |
| 2014/0260263 | A1 * | 9/2014 | Farrell | F01D 9/06 |
| | | | | 60/734 |
| 2017/0176012 | A1 | 6/2017 | Lacy | |
| 2017/0298838 | A1 | 10/2017 | Sathyakumar et al. | |
| 2023/0204214 | A1 * | 6/2023 | Giridharan | F23R 3/286 |
| 2024/0102416 | A1 * | 3/2024 | Lei Ma | F01D 25/32 |
| 2024/0218838 | A1 * | 7/2024 | Woodall | F02C 9/20 |
| 2024/0229710 | A1 * | 7/2024 | Woodall | F02C 7/22 |
| 2024/0309777 | A1 * | 9/2024 | Stevenson | F01D 21/003 |
| 2025/0198294 | A1 * | 6/2025 | Love | F01D 5/288 |

* cited by examiner

350

352

INJECT A FUEL INTO A TURBINE SECTION
OF A TURBINE FROM A FUEL PORT FORMED
INTO A WALL OF THE TURBINE SECTION

354

INJECT AN INERT GAS TOWARD THE
INJECTED FUEL FROM AN INERT GAS PORT
DISPOSED UPSTREAM OF THE FUEL PORT

356

CAUSE THE INJECTED INERT GAS TO
OCCUPY AT LEAST A PORTION OF A
REGION DOWNSTREAM OF THE FUEL PORT

SYSTEM AND METHOD FOR FUEL AND INERT GAS INJECTION IN TURBINE SECTION OF GAS TURBINE ENGINE

STATEMENT REGARDING FEDERALLY SPONSORED RESEARCH & DEVELOPMENT

This invention was made with Government support under contract number DE-AR0001571 awarded by the Department of Energy. The Government has certain rights in the invention.

BACKGROUND

The subject matter disclosed herein relates to a gas turbine engine having fuel injection in a turbine section.

A gas turbine engine generally includes a compressor section, a combustor section, and a turbine section (e.g., an expansion turbine). The turbine section may include one or more turbine stages, each having a plurality of turbine blades. The combustion gas flow expands through the turbine section and drives rotation of the turbine blades in each of the one or more stages. In some configurations, the turbine section may include a plurality of fuel injection ports to inject fuel for combustion in the turbine section, thereby adding additional heat in the turbine section to create an isothermal expansion of gases through the one or more turbine stages. Such isothermal expansion can increase gas turbine efficiency and performance.

Unfortunately, certain conditions in the turbine section may create vulnerabilities to flame holding near a wall of the turbine section at the plurality of fuel injection ports. Accordingly, a need exists for reducing a possibility of flame holding near the wall of the turbine section.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In an embodiment, a system includes at least one component of a turbine section. The at least one component includes a fuel port formed into a wall of the at least one component. The fuel port is configured to inject fuel into a chamber of the turbine section. The at least one component also includes an inert gas port formed into the wall upstream of the fuel port. The inert gas port is configured to inject an inert gas to flow at least partially around the injected fuel into a buffer region downstream from the fuel port.

In another embodiment, a system includes a gas turbine engine having a turbine section having circumferentially spaced airfoils. At least one component of the turbine section includes a fuel injection port formed into a wall of the at least one component. The fuel injection port is configured to direct fuel between successive circumferentially spaced airfoils of the turbine section. The at least one component also includes an inert gas injection port formed into the wall upstream of the fuel port. The inert gas port is configured to direct inert gas to flow at least partially around the fuel into a buffer region downstream from the fuel port.

In another embodiment, a method includes injecting a fuel into a turbine section of a gas turbine engine from a fuel port formed into a wall of at least one component of the turbine section. The method also includes injecting an inert gas toward the injected fuel from an inert gas port disposed upstream of the fuel port. The method also includes causing the injected inert gas to occupy at least a portion of a buffer region downstream of the fuel port.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As described in greater detail below, the disclosed embodiments include a fluid injection system in a turbine section of a gas turbine engine, wherein the fluid injection system includes fuel injection ports to inject fuel for combustion in the turbine section, and inert gas injection ports to help reduce the possibility of flame holding near a wall of the turbine section. For example, a fuel injection port is formed into the wall of the turbine section. Additionally, an inert gas injection port is disposed in the wall upstream of the fuel injection port. The inert gas injection port injects an inert gas at an acute angle (relative to the wall) toward the injected fuel. The injected inert gas remains close to a surface of the wall as it flows toward the injected fuel (e.g., fuel jet region). Once the injected inert gas reaches the injected fuel (e.g., fuel jet), the injected inert gas flows around lateral sides of the fuel jet region and flows into a buffer region (e.g., low-pressure region) disposed downstream of and adjacent to the fuel injection port. In response to the inert gas flowing into this region, the mass fraction of inert gas in the buffer region increases, thereby mitigating the likelihood of ignition of injected fuel close to the surface of the wall, otherwise known as flame anchoring or flame holding.

Figure 1:
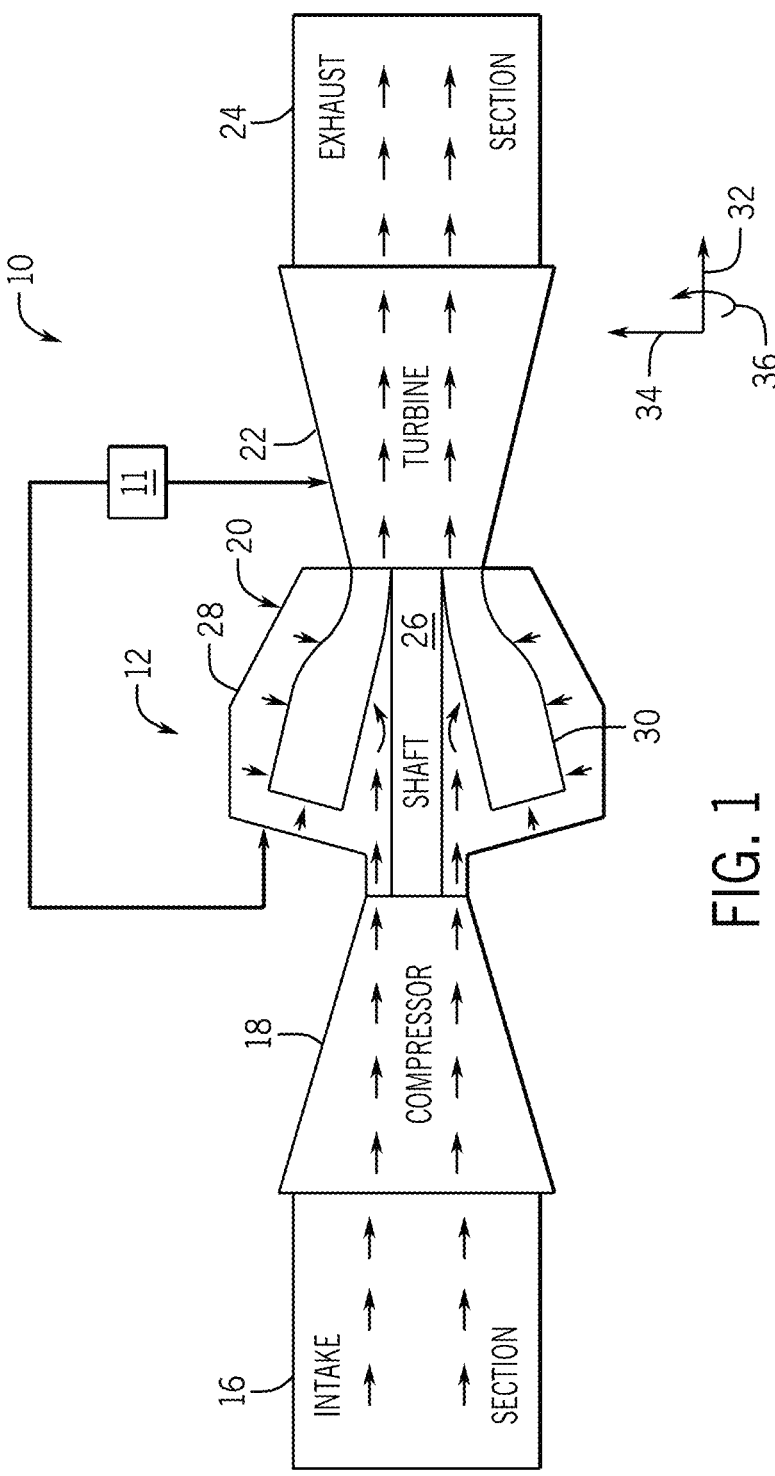
FIG. 1 is a schematic flow diagram of an embodiment of a gas turbine engine having a turbine section with a fuel injection system installed therein, the fuel injection system being configured to mitigate ignition of fuel near a surface of a wall of the turbine section.

With the foregoing in mind, FIG. 1 is a schematic flow diagram of an embodiment of a gas turbine system 10 having a gas turbine engine 12 with a fuel injection system 11. As discussed in detail below, the fuel injection system 11 includes fluid supplies 14 (see FIG. 2) configured to provide fuel and inert gas to the fuel injection system 11. In certain embodiments, the gas turbine system 10 may include an aircraft, a locomotive, a power generation system, or combinations thereof. In serial flow order, the illustrated gas turbine engine 12 includes an air intake section 16, a compressor or compressor section 18, a combustor or combustor section 20, a turbine or turbine section 22 (i.e., an expansion turbine), and an exhaust section 24. The turbine section 22 is coupled to the compressor 18 via a shaft 26.

As indicated by the arrows, air may enter the gas turbine engine 12 through the intake section 16 and flow into the compressor 18, which compresses the air prior to entry into the combustor section 20. The illustrated combustor section 20 includes a combustor housing 28 disposed concentrically or annularly about the shaft 26 between the compressor 18 and the turbine section 22. The compressed air from the compressor 18 enters the combustor section 20, where the compressed air and fuel mix and combust within combustors to drive the turbine section 22. From the combustor section 20, the hot combustion gases flow through the turbine section 22, driving the compressor 18 via the shaft 26. For example, the combustion gases may apply motive forces to turbine blades within the turbine section 22 to rotate the shaft 26.

In the illustrated embodiment, the fuel injection system 11 is disposed in the turbine section 22. In the illustrated embodiment, the fuel injection system 11 may include one or more combined or separate fuel injection systems configured to inject fuel into the combustor section 20 and the turbine section 22. For example, as illustrated in FIG. 1, the fuel injection system 11 injects fuel into the turbine section 22 to provide additional heat in the turbine section 22, while also injecting inert gas to reduce the possibility of flame holding along surfaces in the turbine section 22. After flowing through the turbine section 22, the hot combustion gases may exit the gas turbine engine 12 through the exhaust section 24. The gas turbine engine 12 may be described in terms of a longitudinal direction or axis 32 (e.g., axial direction), a radial direction or axis 34, and a circumferential direction or axis 36.

Figure 2:
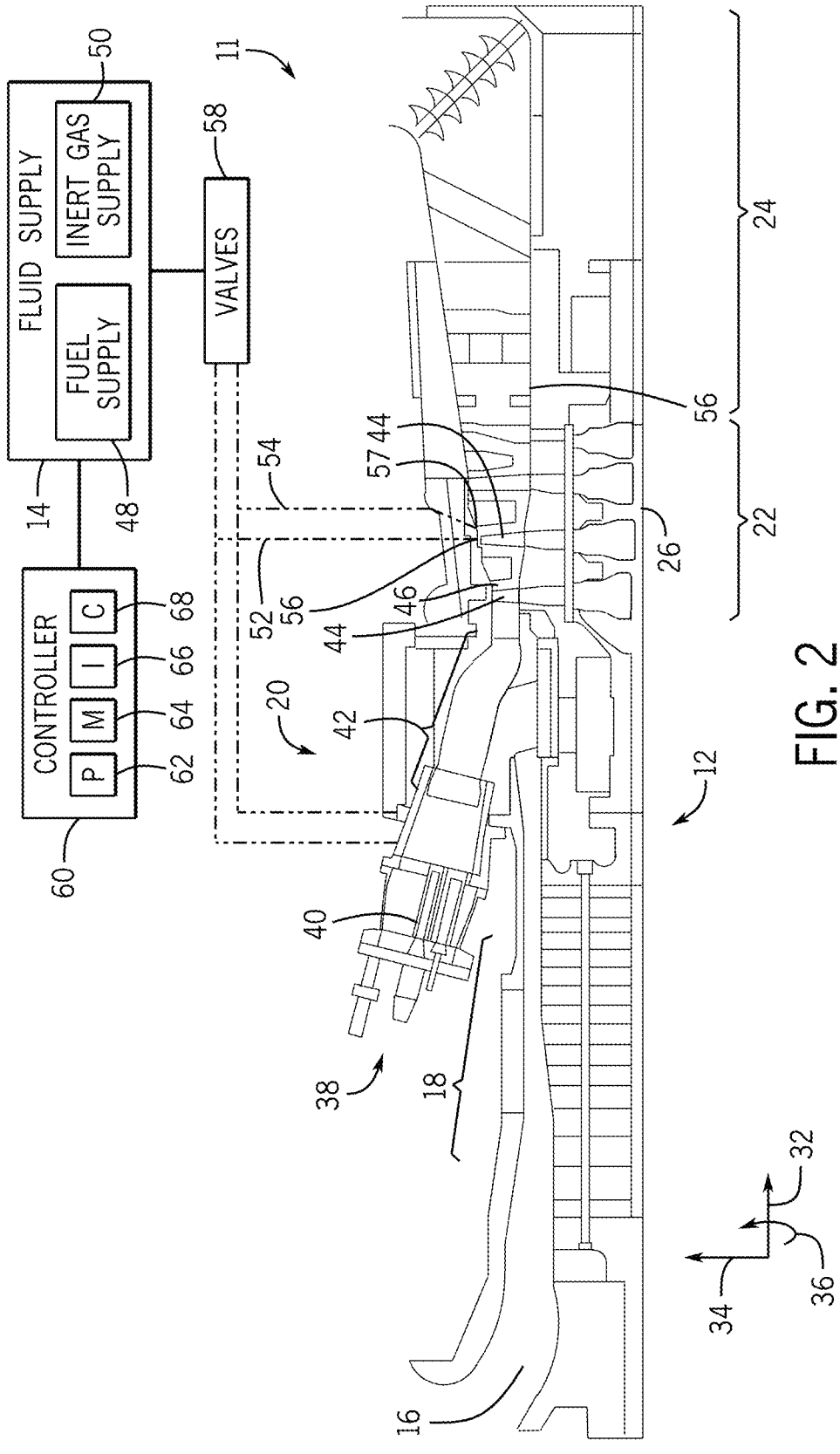
FIG. 2 is a cross-sectional side view of an embodiment of the gas turbine engine of FIG. 1 sectioned through the longitudinal axis.

FIG. 2 is a cross-sectional side view of an embodiment of the gas turbine engine 12 of FIG. 1 sectioned through the longitudinal axis 32, illustrating an embodiment of the fuel injection system 11 (e.g., separate or integrated fuel injection systems) coupled to the combustor section 20 and the turbine section 22. As described above with respect to FIG. 1, air may enter the gas turbine engine 12 through the air intake section 16 and may be compressed by the compressor 18. The compressed air from the compressor 18 may then be directed into the combustor section 20 where the compressed air may be mixed with fuel from the fuel injection system 11. The combustor section 20 includes one or more combustors 38. In certain embodiments, the gas turbine engine 12 may include multiple combustors 38 disposed in an annular arrangement (e.g., in a so-called can-annular combustor arrangement). Further, each combustor 38 may include multiple fuel nozzles 40 attached to or near a head end of each combustor 38 in an annular or other arrangement. In operation, the fuel nozzles 40 may inject a fuel-air mixture into the combustors 38 in a suitable ratio for optimal combustion, emissions, fuel consumption, and power output.

Within the combustor section 20, the fuel-air mixture may combust to generate hot, pressurized combustion gases. After combustion, the hot pressurized combustion gases may flow through a transition piece 42 and exit the combustor section 20 to the turbine section 22. Within the turbine section 22, the pressurized combustion gases may turn blades 44 (e.g., rotating turbine blades) that extend radially within the turbine section 22 and that are disposed between vanes 46 (e.g., stationary turbine vanes) to rotate the shaft 26 before exiting through the exhaust section 24 as exhaust gas.

In certain embodiments, the turbine section 22 may include one or more turbine stages (e.g., 1, 2, 3, 4, or more) disposed at different axial positions along the longitudinal axis 32 of the turbine section 22. Each turbine stage has a plurality of blades 44 (e.g., rotary turbine blades) spaced apart from one another in a circumferential arrangement (e.g., circumferentially spaced) about the longitudinal axis 32 of the turbine section 22 at a common axial position, wherein the blades 44 are coupled to a central turbine rotor or shaft of the turbine section 22. Similarly, each turbine stage has a plurality of vanes 46 (e.g., stationary turbine vanes) spaced apart from one another in a circumferential arrangement (e.g., circumferentially spaced) about the longitudinal axis 32 of the turbine section 22 at a common axial position offset from the blades 44, wherein the vanes 46 are coupled to an outer casing or wall of the turbine section 22. In certain embodiments, each of the blades 44 and the vanes 46 may include an airfoil shaped structure oriented or extending in a radial direction (e.g., radial airfoil).

In the illustrated embodiment, the fuel injection system 11 includes the fluid supplies 14 having a fuel supply 48 and an inert gas supply 50. As shown, the fluid supplies 14 (e.g., fuel supply 48 and inert gas supply 50) are fluidly coupled to the combustor section 20 and the turbine section 22 of the gas turbine engine 22. However, in some embodiments, separate fuel injection systems 11 may be coupled to the combustor section 20 and the turbine section 22. The fuel supply 48 may be configured to store and supply one or more fuels 52, such as natural gas, syngas, methane [$CH_4$], hydrogen [$H_2$], ammonia [$NH_3$], biofuels, or combinations thereof. The inert gas supply 50 may be configured to store and supply one or more inert gases, such as nitrogen [$N_2$], argon [Ar], carbon dioxide [$CO_2$], recirculated exhaust gas (e.g., from an exhaust gas recirculation [EGR] system and containing carbon dioxide), or combinations thereof.

The fuel injection system 11 may be configured to supply the same or different fuels 52 (e.g., natural gas, syngas, methane [$CH_4$], hydrogen [$H_2$], ammonia [$NH_3$], biofuels, or combinations thereof) to the combustor section 20 and the turbine section 22. For example, the fuel injection system 11 may be configured to use relatively low carbon fuels or carbon free fuels (e.g., hydrogen, ammonia, biofuel, or combinations thereof) for both the combustor section 20 and the turbine section 22, or the fuel injection system 11 may be configured to use carbon-containing fuels (e.g., natural gas, syngas, methane, or combinations thereof) for the combustor section 20 and relatively low carbon fuels or carbon free fuels (e.g., hydrogen, ammonia, biofuel, or combinations thereof) for the turbine section 22. In certain embodiments, the fuel injection system 11 may be configured to use different fuels at different operational stages of the gas turbine system 10, such as start-up, steady state, shut-down, part-load conditions, or transient conditions.

The fuel supply 48 is configured to supply a fuel 52 (e.g., natural gas, syngas, methane, hydrogen, ammonia, biofuels, or combinations thereof) to the turbine section 22 and the inert gas supply 50 is configured to supply an inert gas 54 (e.g., carbon dioxide, nitrogen, argon, recirculated exhaust gas, or combinations thereof) to the turbine section 22. As discussed in further detail herein, the fuel 52 is injected into the turbine section 22 via a plurality of fuel injection ports 56 (e.g., fuel ports), and the inert gas 54 is injected into the turbine section 22 via a plurality of inert gas injection ports 57 (e.g., inert gas ports). The fuel injection ports 56 and the inert gas injection ports 57 are disposed directly on and/or between airfoils (e.g., blades 44 and/or vanes 46) in one or more turbine stages of the turbine section 22. The fuel injection ports 56 and the inert gas injection ports 57 may extend from channels formed in the structure of the turbine section 22, wherein the channels may be cylindrical, rectangular, or other shapes. Similarly, depending on the interface of the channels with the surfaces of the turbine section 22, the fuel injection ports 56 and the inert gas injection ports 57 may be circular, rectangular, oval, triangular, polygonal, or other (not necessarily symmetrical) shapes.

In the illustrated embodiment, the fuel injection system 11 includes a plurality of valves 58 that regulates a flowrate of the fuel 52 and/or the inert gas 54 from the fluid supplies 14 to the fuel injection ports 56 and/or the inert gas injection ports 57. As shown, the fuel injection system 11 additionally includes a controller 60 having a processor 62, a memory 64, and communication circuitry 68 coupled to various sensors and actuators of the gas turbine system 10. The processor 62 instructions 66 stored in the memory 64 and executable by the processor 62 to control the gas turbine system 10 and particularly the fuel injection system 11. The controller 60 is communicatively coupled (e.g., via the communication circuitry 68) to the fluid supplies 14, the plurality of valves 58 and, in certain embodiments, a sensor 70 disposed in the turbine section 22. In certain embodiments, the sensor 70 may provide a signal indicative of a flow rate of the fuel 52 and/or the inert gas 54. The controller 60 may be configured to determine an estimated flow rate of fuel 52 and/or the inert gas 54 based on the received signal and control the plurality of valves 58 to control a flowrate of the fuel 52 and/or the inert gas 54 based on the estimated flow rate.

Figure 3:
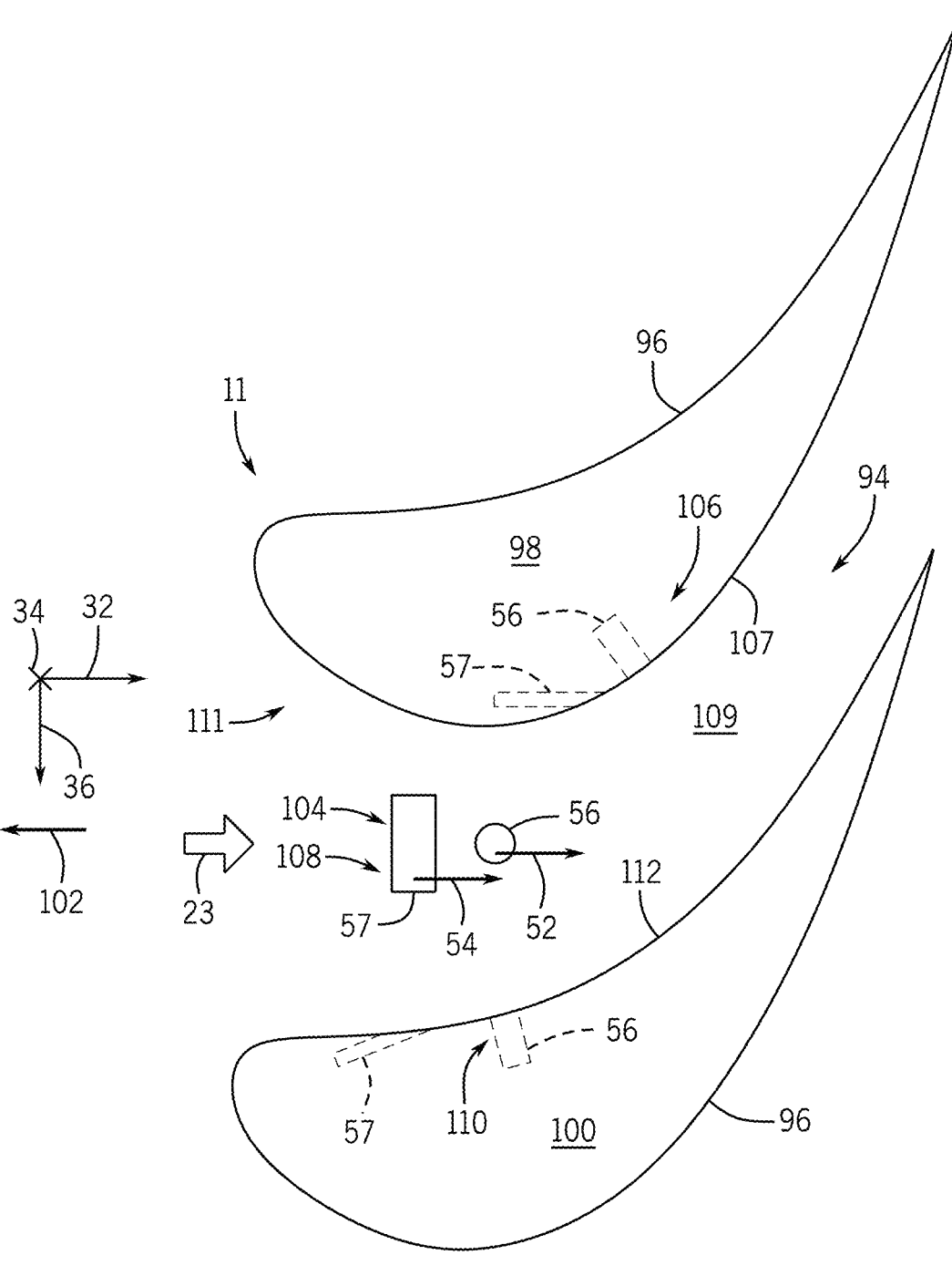
FIG. 3 is a schematic top view of an embodiment of the turbine section of the gas turbine engine of FIG. 2, further illustrating locations of a fuel port and an inert gas port of the fuel injection system.

FIG. 3 is a top view of the turbine section 22 of the gas turbine engine 12 of FIG. 2, further illustrating locations of one or more fuel injection ports 56 and one or more inert gas injection ports 57 of the fuel injection system 11 along a flow path 23 (e.g., hot combustion gas flow) through the turbine section 22. The fuel injection port 56 is configured to direct (e.g., inject) the fuel 52 (e.g., jet, stream, or spray of fuel) into a chamber 94 between successive circumferentially spaced airfoils 96 (e.g., airfoil 98, airfoil 100) of the turbine section 22, and the inert gas injection port 57 is configured to direct the inert gas 54 (e.g., film of inert gas, jet of inert gas) into the chamber 94. In certain embodiments, the airfoils 96 may include turbine blades 44, turbine vanes 46, or a combination thereof. As shown, the inert gas injection port 57 is disposed upstream (e.g., in an upstream direction 102 opposite the flow path 23) relative to the fuel injection port 56. As discussed in further detail herein, the inert gas injection port 57 is configured direct the inert gas 54 to intersect (e.g., contact) and flow around the the fuel 52 injected via the fuel injection port 56, such that the inert gas 54 fills and pressurizes a buffer region (e.g., low-pressure region) downstream of the fuel injection port 56.

The size and shape of the fuel injection port 56 and the inert gas injection port 57 may be the same or different from one another. For example, a width of the inert gas injection port 57 may be greater than a width of the fuel injection port 56, thereby helping to spread the inert gas 54 wider than the fuel 52 to facilitate flow of the inert gas 54 around the fuel 52 to the buffer region. By further example, the inert gas injection port 57 may be elongated in a crosswise direction relative to the flow path 23 and, more specifically, may be shaped as a rectangular port or an oval port. The fuel injection port 56 may be shaped as a circular port. However, the fuel injection port 56 and the inert gas injection port 57 may include circular ports, square ports, rectangular ports, oval ports, triangular ports, polygonal ports, or any combination thereof, and the inert gas injection port 57 may have a larger dimension that the fuel injection port 56.

The fuel injection port 56 and the inert gas injection port 57 may be oriented at the same or different angles relative to a surface of a wall 111. For example, the fuel injection port 56 may be oriented at a 90-degree angle, and the inert gas injection port 57 may be oriented at an acute angle (e.g., 5 to 70, 10 to 60, or 15 to 50 degrees) in the downstream direction of the flow path 23. However, the fuel injection port 56 and the inert gas injection port 57 may be oriented at the same or different angles of less than or equal to 10, 20, 30, 40, 50, 60, 70, 80, or 90 degrees.

In the illustrated embodiment, the turbine section includes sets of ports 104 (e.g., first set 106, second set 108, third set 110) formed into a plurality of walls 111 (e.g., wall 107, wall 109, wall 112) of the turbine section 22. As shown, each set of ports 104 includes a fuel injection port 56 and an inert gas injection port 57 disposed in the upstream direction 102 relative to the fuel injection port 56. In the illustrated embodiment, the turbine section 22 includes the first set 106 formed into the suction side wall 107 of the airfoil 98, the second set 108 formed into the wall 109 between the successive circumferentially spaced airfoils 96, and the third set 110 formed into the pressure side wall 112 of the airfoil 100. In certain embodiments, the wall 111 may include an outer diameter wall of the turbine section 22 (e.g., when the airfoils 96 are stationary vanes). Additionally, or alternatively, the wall 111 may include an inner diameter wall of the turbine section (e.g., when the airfoils 96 are rotating blades). In certain embodiments, the turbine section 22 may include sets of ports 104 formed into both blades 44 and vanes 46 of the turbine section 22. In certain embodiments, the turbine section 22 may include any combination of the sets of ports 104. Although the illustrated embodiment shows the turbine section 22 as including three sets of ports 104 among successive circumferentially spaced airfoils 96 (two sets per airfoil 96 and one set between adjacent airfoils 98, 100), it may be recognized that the turbine section 22 may include more or fewer sets of ports 104 per airfoil 96 and/or pairs of adjacent airfoils (e.g., 98, 100). For example, the turbine section may include 1, 2, 4, 5, 6, or more sets of ports 104 per airfoil 96 and/or pairs of adjacent airfoils (e.g., 98, 100).

Figure 4:
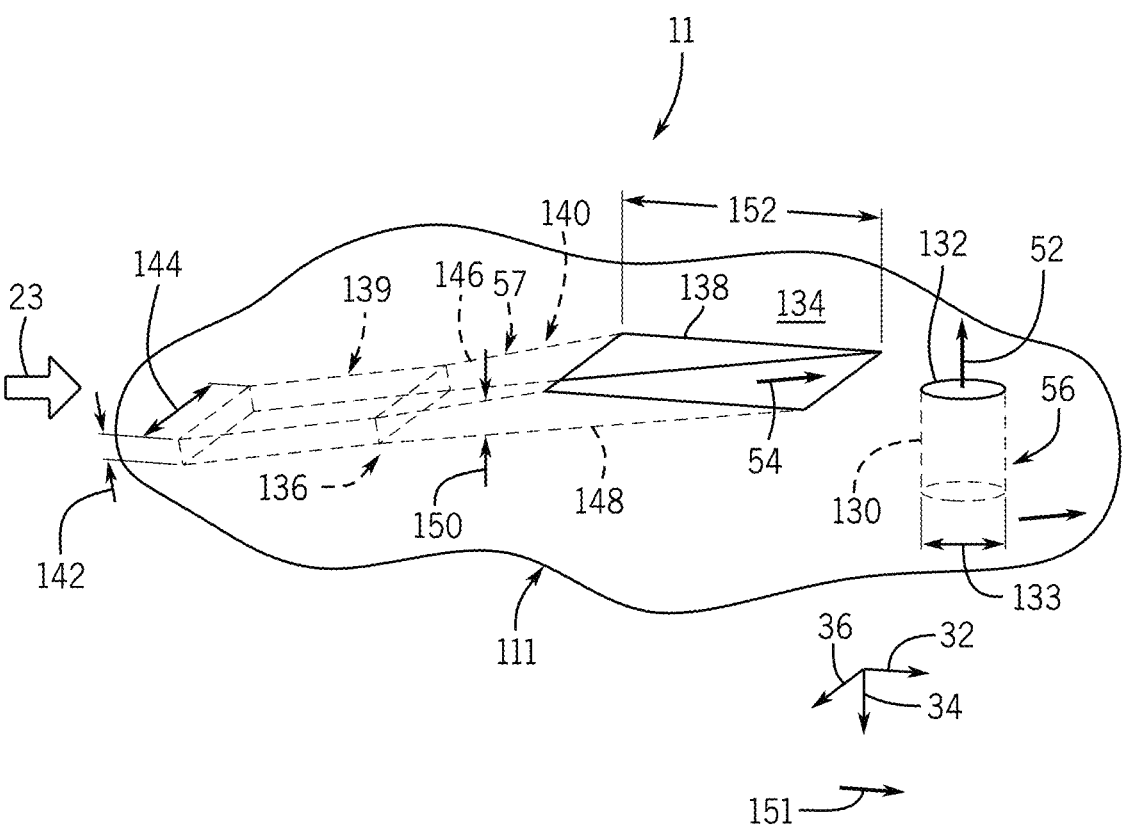
FIG. 4 is a schematic perspective view of an embodiment of the fuel injection system of FIG. 2, further illustrating a fuel port and an inert gas port of the fuel injection system.

FIG. 4 is a perspective view of an embodiment of the fuel injection system 11 of FIG. 2, further schematically illustrating the fuel injection port 56 and the inert gas injection port 57 of the fuel injection system 11. As shown, the fuel injection port 56 includes a fuel port channel 130 fluidly coupled to a fuel port opening 132 (e.g., outlet) at a surface 134 of the wall 111. Additionally, the inert gas injection port 57 includes an inert gas port channel 136 fluidly coupled to an inert gas port opening 138 (e.g., outlet) at the surface 134.

In the illustrated embodiment, the fuel port channel 130 is circular in shape (e.g., cylindrical channel) and is substantially orthogonal (e.g., perpendicular) to the surface 134, such that the fuel injection port 56 is configured to inject the fuel 52 substantially orthogonal to the surface 134. Additionally, as discussed herein, the inert gas port channel 136 is rectangular in shape (e.g., rectangular channel) and is acutely angled relative to the surface 134, such that the inert gas injection port 57 is configured to inject the inert gas 54 at an acute angle, relative to the surface 134, toward the injected fuel 52. For example, the acute angle of the inert gas injection port 57 may be about 5 to 70, 10 to 60, 15 to 50, or 3 to 15 degrees, such as less than or equal to approximately 10, 15, 20, 25, 30, 40, 50, or 60 degrees.

In the illustrated embodiment, the inert gas port channel 136 includes a first channel portion 139 and a second channel portion 140. As shown, a height dimension 142 of the first channel portion 139 is smaller than a width dimension 144 of the first channel portion 139. In certain embodiments, the smaller height dimension 142 of the first channel portion 139 may enable the inert gas injection port 57 to inject the inert gas 54 as a film (e.g., film layer) toward the injected fuel 52. For example, a ratio of the width dimension 144 to the height dimension 142 may be 2:1 to 20:1, 2:1 to 10:1, or 2:1 to 5:1. In some embodiments, a ratio of the width dimension 144 of the inert gas port channel 136 to a width dimension 133 (e.g., diameter) of the fuel port channel 130 may be 1.5:1 to 10:1, 2:1 to 5:1, or 2:1 to 4:1. Additionally, as shown, an upper surface 146 of the second channel portion 140 is acutely angled upward (e.g., skewed) relative to a bottom surface 148 of the second channel portion 140 (e.g., and the first channel portion 139), such that a height dimension 150 of the second channel portion 140 gradually increases along the downstream direction 151, and resulting in the inert gas port opening 138 having a length dimension 152 that is substantially equal to the width dimension 144.

Figure 5:
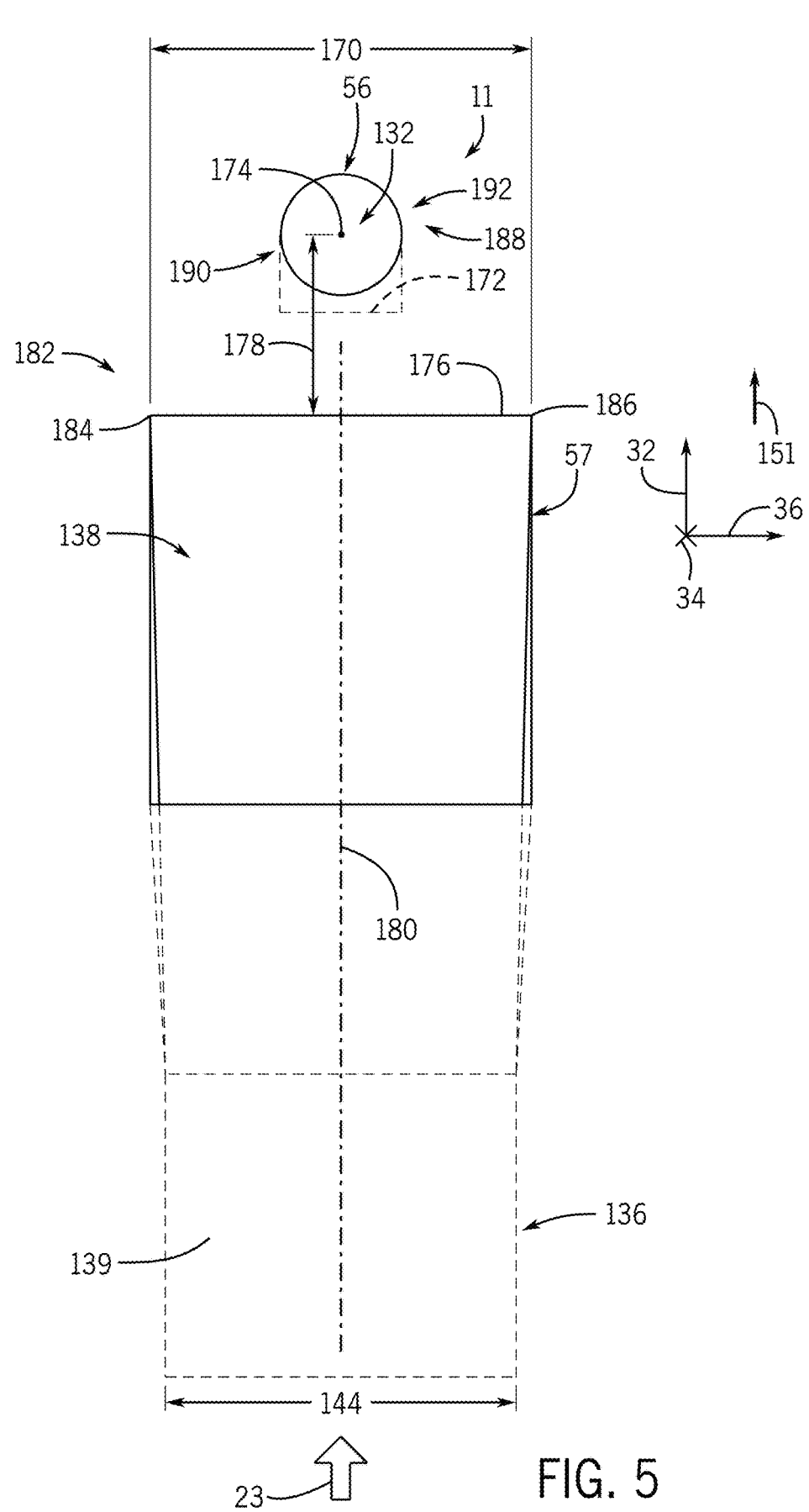
FIG. 5 is a schematic top view of an embodiment of the fuel injection system of FIG. 2, further illustrating the fuel port and the inert gas port.

FIG. 5 is a top view of an embodiment of the fuel injection system 11, further illustrating the fuel injection port 56 and the inert gas injection port 57. As shown, the inert gas port opening 138 includes an inert gas opening width dimension 170 (e.g., first width dimension) that is slightly larger (e.g., less than 10 percent larger) than the width dimension 144 of the first channel portion 139. As shown, the fuel injection port 56 is disposed downstream of the inert gas injection port 57 in the downstream direction 151 of the flow path 23. In the illustrated embodiment, the fuel port opening 132 is circular in shape and has a diameter 172 (e.g., second width dimension, which is equivalent to width dimension 133 of the fuel port channel 130 shown in FIG. 4). In certain embodiments, the fuel port opening 132 may have another shape (e.g., rectangular, triangular, polygonal, etc.). In the illustrated embodiment, the inert gas port opening 138 is shown as being rectangular in shape. In certain embodiments, the inert gas port opening 138 may have another shape (e.g., triangular, elliptical, etc.).

In the illustrated embodiment, the diameter 172 of the fuel port opening 132 is smaller than the inert gas opening width dimension 170 of the inert gas port opening 138. In certain embodiments, a ratio between the diameter 172 of the fuel port opening 132 and the inert gas opening width dimension 170 is between 1:1.5 to 1:10, 1:2 to 1:5, or 1:2 to 1:4. As shown, a fuel port central axis 174 of the fuel port opening 132 is offset from a downstream edge 176 of the inert gas port opening 138 by a length 178. In certain embodiments, a ratio between the diameter 172 of the fuel port opening 132 and the length 178 is between 0.8:1 and 1.2:1. In certain embodiments, the length 178 may be less than or equal to about 1, 1.5, 2, 2.5, 3, 3.5, or 4 times the diameter 172 of the fuel port opening 132.

In the illustrated embodiment, the fuel port central axis 174 of the fuel port opening 132 is aligned with an inert gas port central axis 180 of the inert gas port opening 138 in the downstream direction 151, such that the axes 174 and 180 intersect with one another. That is, the fuel port central axis 174 of the fuel port opening 132 is equidistant from distal ends 182 (e.g., distal end 184, distal end 186) of the downstream edge 176 of the inert gas port opening 138, such that the fuel port opening 132 is disposed between the distal ends 182. It may be appreciated that this configuration of the fuel port opening 132 and the inert gas port opening 138 may enable to the inert gas 54 injected from the inert gas port opening 138 to flow around lateral sides 188 (e.g., lateral side 190, lateral side 192) of the fuel port opening 132 (e.g., and the injected fuel 52). Although the illustrated embodiment shows one fuel port opening 132, it may be recognized that the fuel injection system 11 may include a plurality of fuel port openings 132 for each inert gas port opening 138. For example, the fuel injection system 11 may include 2, 3, 4, or more fuel port openings 132 for each inert gas port opening 138. In certain embodiments, different sets of ports may each include a different number of fuel port openings 132.

Figure 6:
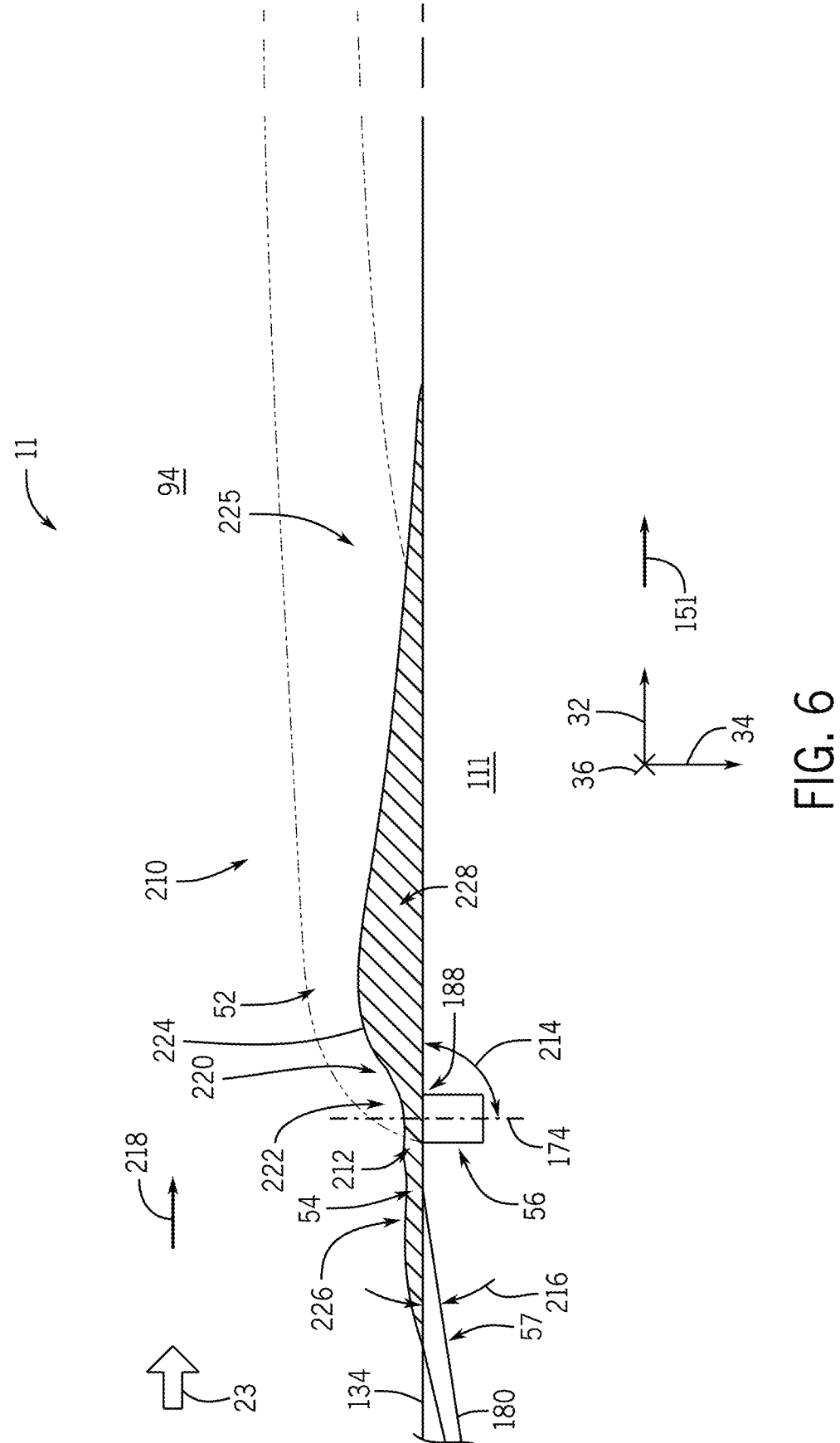
FIG. 6 is a cross-sectional side view of an embodiment of the fuel injection system of FIG. 2, further illustrating a flow path of fuel injected via the fuel port and an inert gas flow path of inert gas injected via the inert gas port.

FIG. 6 is a cross-sectional side view of the fuel injection system 11, further illustrating a flow path 210 of fuel 52 injected via the fuel injection port 56 and an inert gas flow path 212 of inert gas 54 injected via the inert gas injection port 57. As shown, the fuel port central axis 174 is substantially orthogonal (e.g., perpendicular) to the surface 134. In certain embodiments, an angle 214 extending from the surface 134 of the wall 111 to the fuel port central axis 174 is between 45 and 95 degrees, 65 and 95 degrees, or 85 and 95 degrees. Additionally, as shown, the inert gas port central axis 180 is acutely angled relative to the surface 134 (e.g., less than 30 degrees). In certain embodiments, an angle 216 extending from the surface 134 to the inert gas port central axis 180 is between about 5 to 70, 10 to 60, 15 to 50, or 3 to 15 degrees, such as less than or equal to approximately 10, 15, 20, 25, 30, 40, 50, or 60 degrees.

In the illustrated embodiment, a cross flow of core gas 218 (e.g., combustion gas) flows in the downstream direction 151 along the flow path 23 above the injected fuel 52 and inert gas 54. The cross flow of the core gas 218 causes the injected fuel 52 to bend in the downstream direction 151 along the flow path 23. As shown, the injected fuel 52 is ignited after entering the chamber 94 from the fuel injection port 56, forming a fuel jet region 220 (e.g., flame region). In the illustrated embodiment, the mass fraction (e.g., density) of the fuel 52 is greater near an interior portion 222 of the jet region 220 than in an edge portion 224 of the fuel jet region 220. The fuel jet region 220 transitions into a trailing region 225 (e.g., wake region) that includes ignited fuel 52 of lower mass fractions as the ignited fuel 52 moves downstream from the fuel injection port 56. As shown, the inert gas 54, upon injection into the chamber 94, flows through an inert gas jet region 276 toward the fuel jet region 220 while remaining close to the surface 111 due to the angle 216 of entry of the inert gas 54 into the cross flow of core gas 218. In certain embodiments, a pressure ratio of the fuel jet region 220 ranges from 1.5 to 1.7, from 1.55 to 1.65, from 1.575 to 1.625, or a combination thereof. In certain embodiments, a pressure ratio of the inert gas jet region 226 ranges from 1.0 to 1.2, from 1.05 to 1.15, from 1.075 to 1.125, or a combination thereof.

As shown, upon reaching the fuel jet region 220, the inert gas 54 flows around the lateral sides 188 of the fuel jet region 220 and at least partially fills and pressurizes a buffer region 228 disposed downstream of the fuel jet region 220 and between the trailing region 225 and the surface 111. The inert gas 54 fills this region with a near-uniform mass fraction. It may be appreciated that the filling of the buffer region 228 with the inert gas 54 mitigates the ignition of the injected fuel 52 near the surface 111 downstream of the fuel injection port 56.

Figure 7:
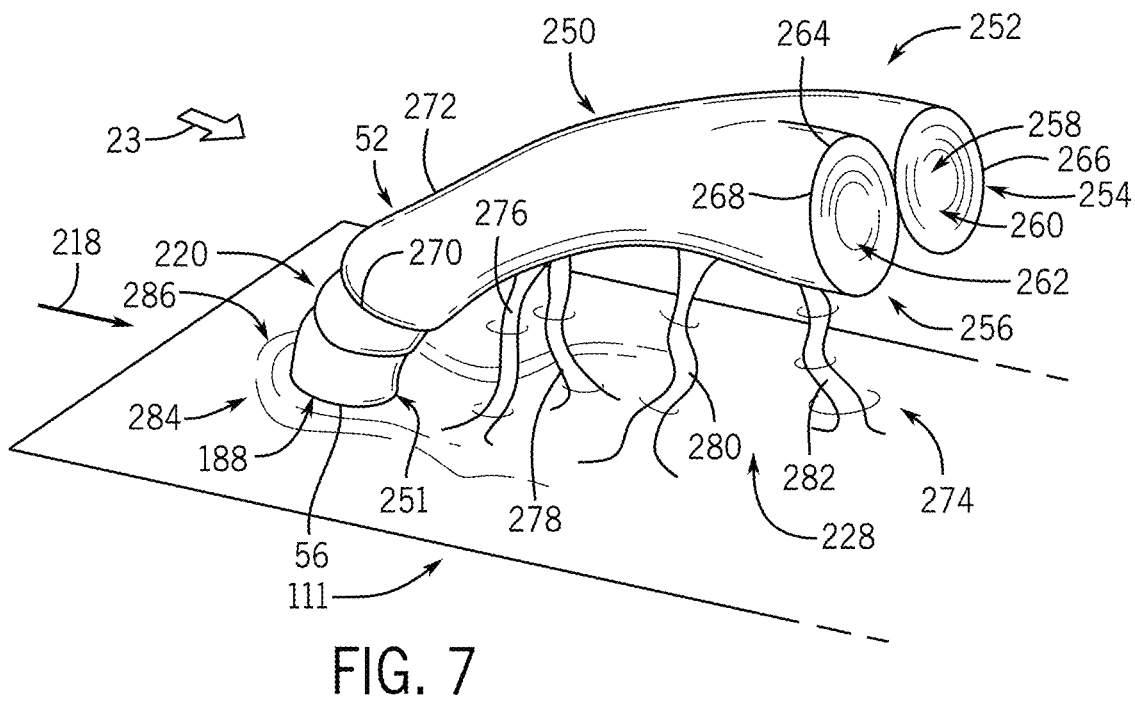
FIG. 7 is a schematic perspective view of an embodiment of the flow path of FIG. 6.

FIG. 7 is a schematic view of an embodiment of a flow path 250 of the injected fuel 52 and the inert gas 54. In the illustrated embodiment, the flow path 250 includes the fuel jet region 220 that is impinged by a crossflow of core gas 218 in the flow path 23. In the illustrated embodiment, the fuel jet region 220 transitions from a single jet portion 251 to a pair of counter-rotating vortices 252 (e.g., first vortex 254, second vortex 256). As discussed further herein, a velocity of the injected fuel 52 is smaller at vortex interior portions 258 (e.g., vortex interior portion 260, vortex interior portion 262) of the counter-rotating vortices 252 than vortex edge portions 264 (e.g., vortex edge portion 266, vortex edge portion 268) of the counter-rotating vortices 252.

In the illustrated embodiment, the single jet portion 251 of the fuel jet region 220 includes shear-layer vortices 270 formed in an outer portion 272 of the single jet portion 251. As shown, the flow path 250 additionally includes a plurality of wake vortices 274 (e.g., wake vortices 276, 278, 280, and 282), such that each wake vortex 274 extends from the single jet portion 251 and/or the counter-rotating vortices 252 to the wall 111. Although the illustrated embodiment shows four wake vortices 274, the flow path 250 may include fewer or more wake vortices 274. As shown, the plurality of wake vortices 274 extends through the buffer region 228 disposed above the wall 111 and beneath the single jet portion 251 and/or the counter-rotating vortices 252.

Additionally, as shown, the flow path 250 includes horseshoe vortices 284 that flow around the lateral sides 188 of the single jet portion 251. As shown, the horseshoe vortices 284 flow from an upstream area 286 upstream of the fuel jet region 220 to the buffer region 228 downstream of the fuel jet region 220. In certain embodiments, the horseshoe vortices 284 transfer the inert gas 54 from the inert gas port to the buffer region 228. As discussed herein, the higher mass fraction of the inert gas 54 within the buffer region 228 mitigates the ignition of the injected fuel 52 in the buffer region 228, thereby mitigating the ignition of the injected fuel 52 near the surface 111 downstream of the fuel injection port 56. The inert gas 54 in the buffer region 228 lifts the fuel 52 away from the surface 111 and promotes the ignition and flame formation in the hot gas flow path 23.

Figure 8:
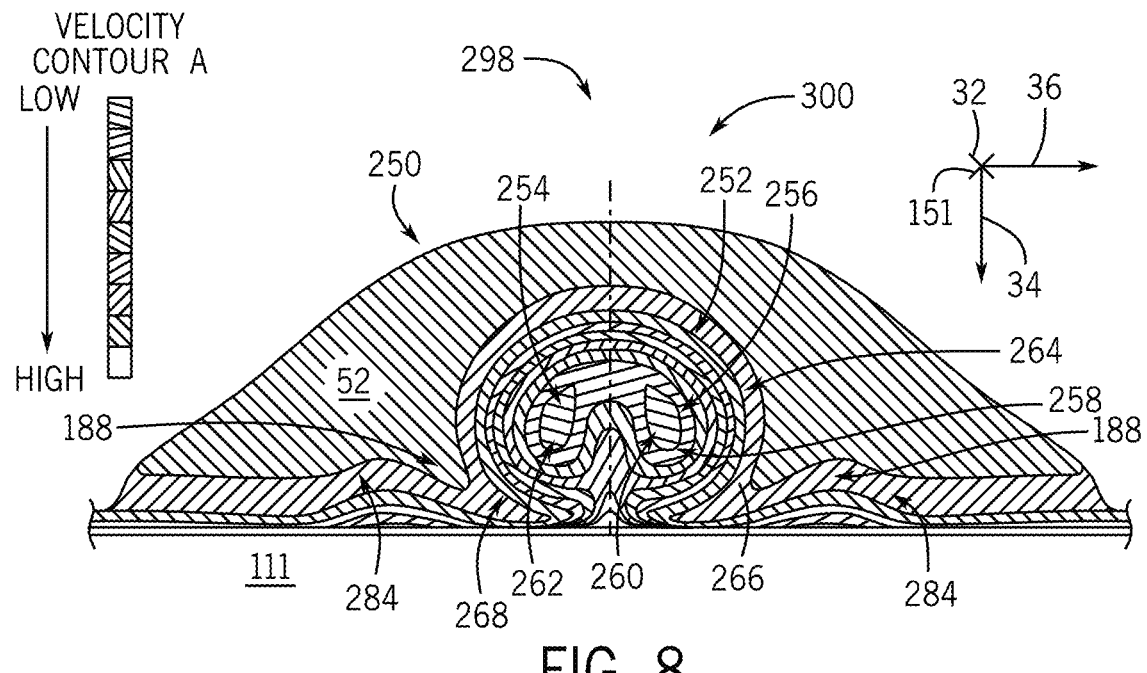
FIG. 8 is a transverse plot showing an embodiment of a velocity profile of the flow path of FIG. 6.

FIG. 8 is a transverse plot 298 showing a velocity profile 300 of the flow path 250 of the fuel 52 and the inert gas 54. As shown, the transverse plot 298 shows a perspective having the downstream direction 151 being into the page. As shown, the transverse plot 298 shows the flow path 250 as including the pair of counter-rotating vortices 252 having the first vortex 254 and the second vortex 256. As shown, the velocity of the injected fuel 52 is smaller at the vortex interior portions 258 (e.g., vortex interior portion 260, vortex interior portion 262) of the counter rotating vortices 252 than vortex edge portions 264 (e.g., vortex edge portion 266, vortex edge portion 268) of the counter rotating vortices 252. In the illustrated embodiment, the vortex interior portions 258 form a kidney bean-shaped region where the velocity of the injected fuel 52 is lower than the surrounding vortex edge portions 264.

Additionally, the transverse plot 298 shows the horseshoe vortices 284 that flow around the lateral sides 188 of the single jet portion. As shown, the horseshoe vortices 284 are shown as the regions pinched between the counter rotating vortices 252 and the wall 111 that have higher velocity. The horseshoe vortices 284 assist in carrying the inert gas 54 from the inert gas port 57, around the lateral sides 188 of the fuel port 56, and to the buffer region 228 downstream of the fuel port 56.

Figure 9:
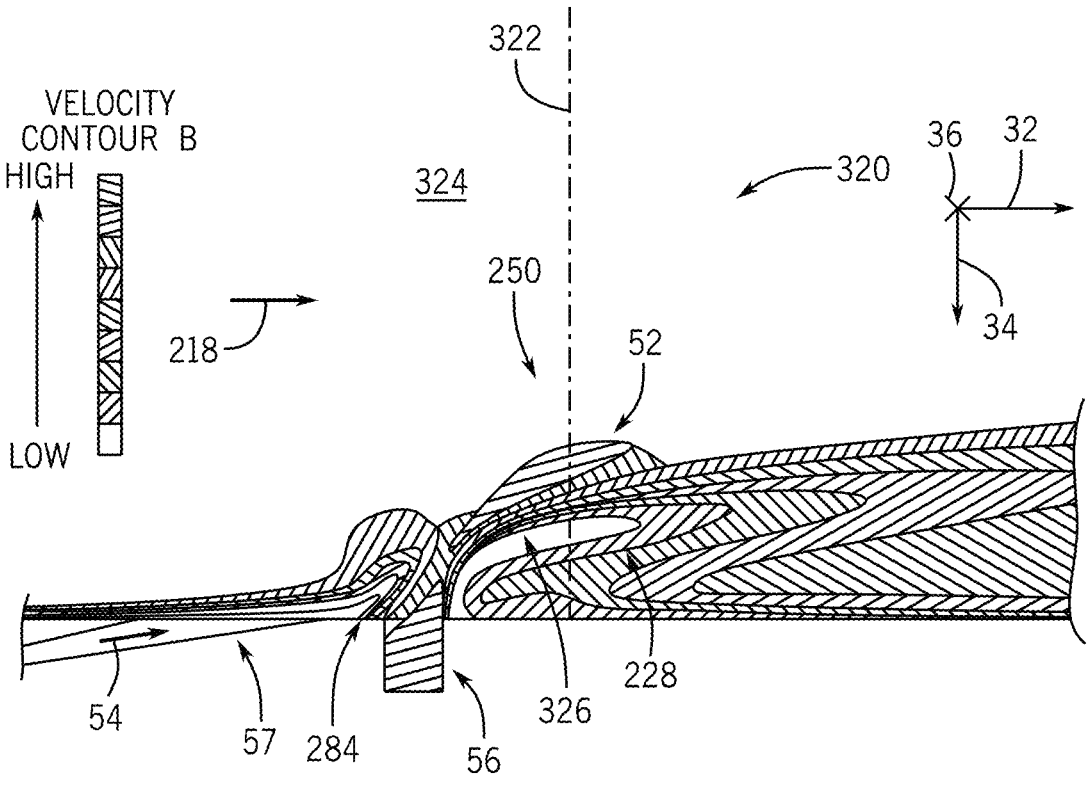
FIG. 9 is a plot orthogonal to the plot of FIG. 8 showing an embodiment of the velocity profile of the flow path.

FIG. 9 is a longitudinal plot 320 orthogonal to the transverse plot 298 of FIG. 8 showing the velocity profile 300 of the flow path 250. In the illustrated embodiment, the line 322 depicts the cross-section used for the transverse plot 298 of FIG. 8. As shown, the velocity of the flow path 250 is lower in the buffer region 228 compared to a cross flow region 324 where the core gas 218 flows freely. As shown, the buffer region 228 includes low velocity region 326 immediately downstream of the fuel injection port 56 where the velocity of the flow path 250 is lower than the remainder of the buffer region 228. It may be appreciated that the inert gas 54 may flow into the buffer region 228 from the inert gas injection port 57 and at least partially diffuse throughout the buffer region 228 because of the low velocity profile and a low pressure of the buffer region 228. That is, the inert gas 54 becomes at least partially entrained in the buffer region 228, via being carried by the horseshoe vortices 284, at least due to the low velocity and low pressure of the buffer region 228 drawing the inter gas 54 into the buffer region 228. As discussed herein, it may be appreciated that the entrainment of the inert gas 54 in the buffer region 228 may mitigate the ignition of the fuel 52 (e.g., flame anchoring) downstream of the fuel injection port 56 along the wall.

Figure 10:
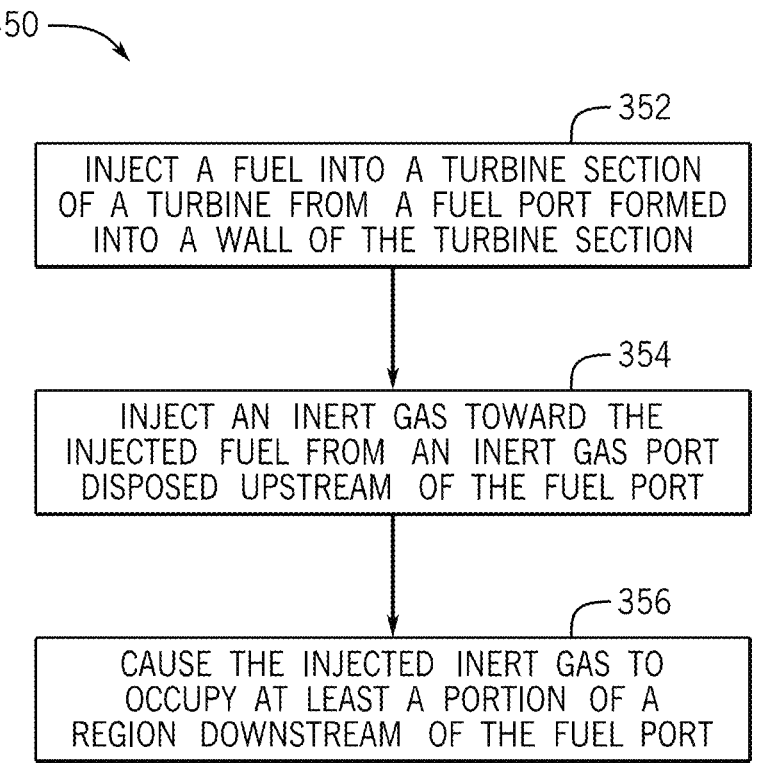
FIG. 10 is a flowchart showing an example process for operating the fuel injection system of FIG. 2.

FIG. 10 is a flowchart showing an example process 350 for operating the fuel injection system 11. The process 350 may be performed by the controller 60 of FIG. 2 or any other suitable computing device(s) or controller(s). Furthermore, the actions of the process 350 may be performed in the order disclosed herein or in any other suitable order. For example, certain actions of the process 350 may be performed concurrently.

In block 352 of the process 350, a fuel is injected between successive circumferentially spaced airfoils of a turbine section of a turbine from a fuel port formed into a wall of the turbine section. In certain embodiments, the airfoils may include turbine vanes, turbine blades, or a combination thereof. Additionally, or alternatively, the wall may include a wall of a turbine vane, a wall of a turbine blade, an inner diameter wall of the turbine section, an outer diameter wall of the turbine section, or a combination thereof. The fuel may be injected substantially orthogonal to a surface of the wall. In certain embodiments, the fuel may include natural gas, syngas, methane, hydrogen, ammonia, biofuels, or combinations thereof.

In block 354 of the process 350, an inert gas is injected toward the injected fuel from an inert gas port disposed upstream of the fuel port. The inert gas may be injected at an acute angle relative to the surface of the wall toward the injected fuel (e.g., fuel jet). In certain embodiments, the injected inert gas may include an injected layer (e.g., film) of inert gas. In certain embodiments, the inert gas may include carbon dioxide, nitrogen, argon, recirculated exhaust gas, or combinations thereof. In certain embodiments, the injected fuel may produce a set of counter-rotating vortices, wherein a velocity of the fuel, the inert gas, or a combination thereof is lower near a center of each vortex of the set of counter-rotating vortex.

In block 356 of the process 350, the injected inert gas is caused to occupy at least a portion of the buffer region downstream of the fuel port. As discussed herein, the mass fraction of the inert gas may be relatively uniform throughout the occupied portion of the buffer region. It may be appreciated that the presence of the inert gas in the buffer region may mitigate an ignition of the fuel near the surface of the wall downstream of the fuel port (e.g., flame anchoring) and/or help to lift the flame from the ignited fuel into the hot gas flow path.

Technical effects of the disclosed embodiments include causing an inert gas injected upstream of a fuel port, the fuel port formed into a wall of a turbine section, to flow into and at least partially occupy a buffer region downstream of the fuel port. The increased mass fraction of inert gas in the buffer region mitigates flame anchoring (e.g., sustain ignition of the injected fuel) downstream of the fuel port and near the surface of the wall.

The subject matter described in detail above may be defined by one or more clauses, as set forth below.

According to a first aspect, a system includes: at least one component of a turbine section including: a fuel port formed into a wall of the at least one component, wherein the fuel port is configured to inject fuel into a chamber of the turbine section; and an inert gas port formed into the wall upstream of the fuel port, wherein the inert gas port is configured to inject an inert gas to flow at least partially around the injected fuel into a buffer region downstream from the fuel port.

The system of the preceding clause, wherein the chamber is disposed between successive circumferentially spaced airfoils of the turbine section.

The system of any preceding clause, wherein the successive circumferentially spaced airfoils include blades or vanes in a respective turbine stage.

The system of any preceding clause, wherein the wall includes at least one of a blade wall of the blades, a vane wall of the vanes, an inner diameter wall of the turbine section, or an outer diameter wall of the turbine section.

The system of any preceding clause, wherein a first ratio of a first width dimension of a fuel port opening of the fuel port and a second width dimension of an inert gas port opening of the inert gas port is between 1:2 and 1:4.

The system of any preceding clause, wherein a length is defined by a distance from a fuel port central axis of the fuel port opening and a downstream edge of the inert gas port opening, wherein a second ratio of the first width dimension of the fuel port opening and the length is between 1:2 and 3:1.

The system of any preceding clause, wherein a first angle between a central axis of the inert gas port and a surface of the wall is less than 30 degrees, wherein a second angle between a central axis of the fuel port and the surface is between 45 and 95 degrees.

The system of any preceding clause, wherein the fuel port opening is disposed between first and second distal ends of the second width dimension of the inert gas port opening.

The system of any preceding clause, wherein the fuel port central axis is equidistant from the first and second distal ends.

The system of any preceding clause, wherein the first width dimension of the fuel port opening is defined by a diameter of the fuel port opening, and a shape of the inert gas port opening is rectangular.

The system of any preceding clause, wherein a first pressure ratio of the fuel injected from the fuel port is between 1.5 and 1.7, and a second pressure ratio of the inert gas injected from the inert gas port is between 1.0 and 1.2.

The system of any preceding clause, including the at least one component of the turbine section, the turbine section, a gas turbine engine, or a combination thereof.

According to a second aspect, a system includes a gas turbine engine having a turbine section having circumferentially spaced airfoils, wherein at least one component of the turbine section includes: a fuel injection port formed into a wall of the at least one component, wherein the fuel injection port is configured to direct fuel between successive circumferentially spaced airfoils of the turbine section; and an inert gas injection port formed into the wall upstream of the fuel port, wherein the inert gas port is configured to direct inert gas to flow at least partially around the fuel into a buffer region downstream from the fuel port.

The system of the preceding clause, wherein the successive circumferentially spaced airfoils includes blades or vanes of a respective turbine stage of the turbine section.

The system of any preceding clause, wherein a first ratio of a first width dimension of a fuel port opening of the fuel injection port and a second width dimension of an inert gas port opening of the inert gas injection port is between 1:2 and 1:4.

The system of any preceding clause, wherein a length is defined by a distance from a fuel port central axis of the fuel port opening and a downstream edge of the inert gas port opening, wherein a second ratio of the second width dimension of the fuel injection port and the length is between 1:2 and 3:1.

The system of any preceding clause, wherein the inert gas port is a rectangular port, and the inert gas port is oriented at an acute angle of less than or equal to 30 degrees relative to the wall.

According to a third aspect, a method includes: injecting a fuel into a turbine section of a gas turbine engine from a fuel port formed into a wall of at least one component of the turbine section; injecting an inert gas toward the injected fuel from an inert gas port disposed upstream of the fuel port; and causing the injected inert gas to occupy at least a portion of a buffer region downstream of the fuel port.

The method of the preceding clause, wherein injecting the fuel includes injecting the fuel orthogonal to a surface of the wall into a chamber disposed between successive circumferentially spaced airfoils of the turbine section, and injecting the inert gas includes injecting the inert gas at an acute angle relative to the surface into the chamber and toward the injected fuel.

The method of any preceding clause, wherein the injected fuel produces a set of counter-rotating vortices, wherein a velocity of the fuel, the inert gas, or a combination thereof is lower near a center of each vortex of the set of counter-rotating vortex.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
at least one component of a turbine section comprising:
a fuel port formed into a wall of the at least one component, wherein the fuel port is configured to inject fuel into a chamber of the turbine section; and
an inert gas port formed into the wall directly upstream of the fuel port, wherein the inert gas port is configured to inject an inert gas to flow at least partially around the injected fuel into a buffer region downstream from the fuel port;
wherein the fuel port and the inert gas port are arranged along a common axis in a flow direction of the inert gas.

2. The system of claim 1, wherein the chamber is disposed between successive circumferentially spaced airfoils of the turbine section.

3. The system of claim 2, wherein the successive circumferentially spaced airfoils comprise blades or vanes in a respective turbine stage.

4. The system of claim 3, wherein the wall comprises at least one of a blade wall of the blades, a vane wall of the vanes, an inner diameter wall of the turbine section, or an outer diameter wall of the turbine section.

5. The system of claim 1, wherein a first width dimension of a fuel port opening of the fuel port is less than a second width dimension of an inert gas port opening of the inert gas port.

6. The system of claim 5, wherein the first width dimension is less than one half of the second width dimension.

7. The system of claim 5, wherein a first angle between an inert gas central axis of the inert gas port and a surface of the wall is less than a second angle between a fuel port central axis of the fuel port and the surface, and the inert gas central axis and the fuel port central axis are aligned with the common axis.

8. The system of claim 6, wherein the first width dimension is greater than one quarter of the second width dimension.

9. The system of claim 7, wherein the first angle is less than 30 degrees and the second angle is between 45 degrees and 95 degrees.

10. The system of claim 6, wherein the first width dimension of the fuel port opening is defined by a diameter of the fuel port opening, and a shape of the inert gas port opening is rectangular.

11. The system of claim 1, wherein a first pressure ratio of the fuel injected from the fuel port is between 1.5 and 1.7, and a second pressure ratio of the inert gas injected from the inert gas port is between 1.0 and 1.2.

12. The system of claim 1, comprising the at least one component of the turbine section, the turbine section, a gas turbine engine, or a combination thereof.

13. A system, comprising:
a gas turbine engine having a turbine section having circumferentially spaced airfoils, wherein at least one component of the turbine section comprises:
a fuel injection port formed into a wall of the at least one component, wherein the fuel injection port is configured to direct fuel between successive circumferentially spaced airfoils of the turbine section; and
an inert gas injection port formed into the wall directly upstream of the fuel port, wherein the inert gas port is configured to direct inert gas to flow at least partially around the fuel into a buffer region downstream from the fuel port;
wherein the fuel port and the inert gas port are arranged along a common axis in a flow direction of the inert gas.

14. The system of claim 13, wherein the successive circumferentially spaced airfoils comprise blades or vanes of a respective turbine stage of the turbine section.

15. The system of claim 14, wherein a first ratio of a first width dimension of a fuel port opening of the fuel injection port and a second width dimension of an inert gas port opening of the inert gas injection port is between 1:2 and 1:4.

16. The system of claim 15, wherein a length is defined by a distance from a fuel port central axis of the fuel port opening and a downstream edge of the inert gas port opening, wherein a second ratio of the second width dimension of the fuel injection port and the length is between 1:2 and 3:1.

17. The system of claim 13, wherein the inert gas port is a rectangular port, and the inert gas port is oriented at an acute angle of less than or equal to 30 degrees relative to the wall.

18. A method, comprising:
injecting a fuel into a turbine section of a gas turbine engine from a fuel port formed into a wall of at least one component of the turbine section;
injecting an inert gas toward the injected fuel from an inert gas port formed into the wall directly upstream of the fuel port; and
causing the injected inert gas to occupy at least a portion of a buffer region downstream of the fuel port;
wherein the fuel port and the inert gas port are arranged along a common axis in a flow direction of the inert gas.

19. The method of claim 18, wherein injecting the fuel comprises injecting the fuel orthogonal to a surface of the wall into a chamber disposed between successive circumferentially spaced airfoils of the turbine section, and injecting the inert gas comprises injecting the inert gas at an acute angle relative to the surface into the chamber and toward the injected fuel.

20. The method of claim 18, wherein the injected fuel produces a set of counter-rotating vortices, wherein a velocity of the fuel, the inert gas, or a combination thereof is lower near a center of each vortex of the set of counter-rotating vortex.

* * * * *